United States Patent [19]

Albertson et al.

[11] 4,040,636
[45] Aug. 9, 1977

[54] COMPOSITE PACKING

[75] Inventors: Kenneth Ray Albertson; Gerald Helmut Beck, both of Salt Lake City, Utah

[73] Assignee: Parker-Hannifin Corporation, Cleveland, Ohio

[21] Appl. No.: 729,252

[22] Filed: Oct. 4, 1976

[51] Int. Cl.² .............................................. F16J 15/24
[52] U.S. Cl. ................................. 277/188 A; 277/185; 277/221; 277/227
[58] Field of Search ............................. 277/181-189, 277/188 A, 188 R, 216, 221, 227

[56] References Cited

U.S. PATENT DOCUMENTS

| | | | |
|---|---|---|---|
| 2,968,516 | 1/1961 | Jarvis | 277/188 A X |
| 3,095,619 | 7/1963 | Peterson | 277/189 X |
| 3,169,776 | 2/1965 | Felt | 277/188 R X |
| 3,342,500 | 9/1967 | Knudson | 277/188 A X |
| 3,885,801 | 5/1975 | Scannell | 277/188 R X |
| 3,930,657 | 1/1976 | Svensson et al. | 277/188 A |

FOREIGN PATENT DOCUMENTS

| | | | |
|---|---|---|---|
| 267,946 | 6/1966 | Australia | 277/188 A |
| 89,125 | 4/1937 | Sweden | 277/188 A |
| 454,900 | 10/1936 | United Kingdom | 277/227 |

Primary Examiner—Robert S. Ward, Jr.
Attorney, Agent, or Firm—John N. Wolfram

[57] ABSTRACT

A composite packing comprising a first ring positioned between a pair of other rings, the rings being of deformable material but with the first ring being more readily deformable than the pair of rings, each of the pair of rings having an undercut recess facing the first ring, and the first ring having axial extensions projecting into the undercut recesses for holding the rings together as a unitary assembly.

13 Claims, 3 Drawing Figures

COMPOSITE PACKING

BACKGROUND OF THE INVENTION

In double acting hydraulic cylinders, such as shown in U.S. Pat. No. 3,673,925, fluid under pressure is alternately admitted under high pressure and exhausted under low pressure from opposite sides of a piston. The piston carries packings to prevent leakage of fluid from either side of the piston to the other. When U cups are employed for this purpose, two oppositely facing cups must be provided because U cups seal in only one direction and it is necessary to seal in both directions.

Heretofore it has been proposed to form a unitary packing assembly for double acting cylinders by placing two U cups of fabric material impregnated with hard synthetic rubber with their open ends facing each other and bonding the same to a spreader ring of softer synthetic rubber that fills the recesses in the U cups and provides a center section that keeps the U cups spaced apart.

Bonding is done by curing the rubber of all three parts simultaneously while the parts are in contact with each other in a mold. This results in a costly molding operation and is furthermore not suitable when it is desired to use a synthetic rubber material for the spreader ring and to use a relatively hard plastic material, such as polyurethane, for the U cups. In such case, to cure the rubber while assembled to the polyurethane rings will not result in a sufficiently strong bond between the parts.

SUMMARY OF THE INVENTION

The present invention provides a composite packing suitable for sealing against high pressure fluid acting on either end thereof, as when installed in a double-acting piston and cylinder, and in which the packing includes a first or spreader ring of readily deformable elastomeric material positioned between a pair of U cup rings of less readily deformable material and in which the U cups each has an undercut recess and the spreader ring has an axial extension on either end thereof and which projects into a respective one of the undercut recesses to mechanically lock the three rings together as a unitary assembly.

Furthermore, the spreader ring projects transversely beyond the U cups to assure initial contact with the surfaces of the piston and cylinder that are to be sealed.

DETAIL DESCRIPTION

Figure 1:
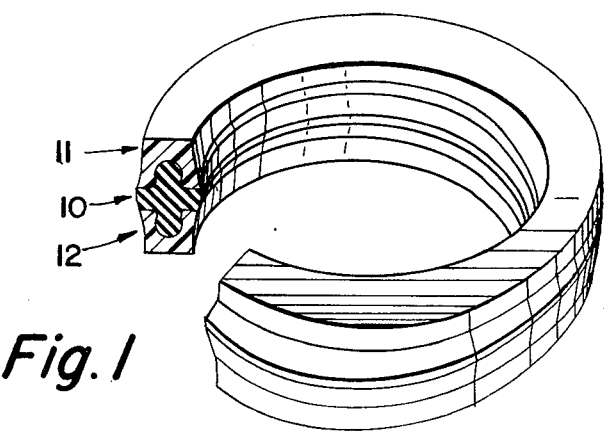
FIG. 1 is a perspective view, partly in cross section, of the composite ring.

The composite packing comprises a first ring 10 positioned between second and third rings 11 and 12. First ring 10 is of relatively soft and deformable elastic material such as synthetic rubber or other synthetic elastomers, either thermoset or thermoplastic, and which, for example, may have a durometer of between Shore A hardnesses of 60 and 95. Rings 11 and 12, which are generally U shaped in cross section, are of a deformable or yieldable material, including flexible or relatively rigid elastomers (such as relatively hard rubber) and thermoset or thermoplastic plastics (such as polyurethane and polyamide) or rings 11 and 12 may be of other deformable or yieldable material (such as metal), but all of which materials are harder and less readily deformable than the material of the particular first ring 10 with which the rings 11, 12 are to be assembled. Thus, when rings 11, 12 are non-metallic their durometer, for example, may be between hardnesses of 90 Shore A and 125R or 100M on the Rockwell Scale but always providing that the rings 11, 12 are harder or less readily deformable than the particular ring 10 with which they are assembled.

Each of the rings 11, 12 has a base portion 14 of an initial width W that is less than the distance D between radially opposed surfaces 15 and 17 of a cylinder 16 and a groove 18 in a piston 19, and which surfaces 15 and 17 are to be sealed.

Each of the rings 11, 12 has a recess 20 therein of an undercut nature whereby the transverse width A of an interior portion of the recess is of greater width than the transverse width B toward the open end of each recess. The recesses 20 result in formation of radially inner and outer lips 22, 23 that project from the base portion 14 on each of the rings 11, 12. Preferably, but not necessarily, the recesses 20 are initially generally circular in cross section except where they flare outwardly at 25 to merge with the end faces 26 of the lips 22, 23.

First ring 10 has a central section 30 that is complimentary to and in contact with end faces 26 of the lips on rings 11, 12. The outer surfaces 27, 28 of lips 22, 23 flare outwardly from the respective base portion 14 so that the largest dimension C thereacross is initially larger than either of dimensions W and D.

Central portion 30 has at its radially inner and outer margins cylindrical surfaces 32, 33 with an initial transverse dimension E thereacross that is larger than either dimension C and D. These surfaces 32, 33 intersect respective surfaces 35, 36, 37 and 38 that are inclined to the longitudinal axis of the packing at an angle M that is greater than the angle L between surfaces 27, 28 and the longitudinal axis of the packing. However, the smallest transverse dimension between surfaces 35, 37 and between 36, 38 is substantially the same as the largest transverse dimension C between surfaces 27, 28.

First ring 10 has a pair of axial extensions 40, 41 projecting from central portion 30 and which are initially shaped to conform to the walls of recesses 20 and flared portions 25 so as to initially completely fill such recesses 20 and thus provide an interlocking engagement with such undercut recesses to hold the three rings together as a unitary assembly. This interlocking engagement constitutes a mechanical connection between the parts so that the parts are held together even in the absence of an adhesive or chemical bond. However, if desired the surfaces of first ring 30 may be bonded to the adjacent surfaces of rings 11, 12 by means of an adhesive or through bonding effected by heat to supplement the mechanical bond.

Figure 3:
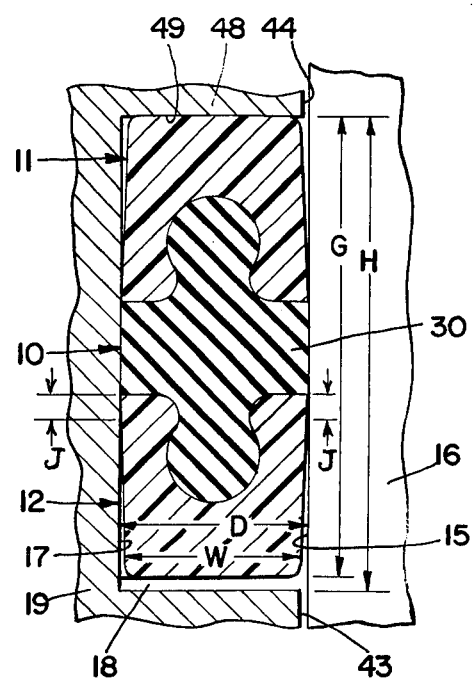
FIG. 3 is a cross section view of the composite ring in the installed condition between a piston and cylinder.

In the installed condition of the packing, as shown in FIG. 3, the central portion 30 is deformed from the initial transverse width E to a dimension coinciding with dimension D, the distance between piston and cylinder surfaces 17 and 15, so that such central portion 30 will be in initial sealing contact with surfaces 15 and 17 even though there is no significant fluid pressure within cylinder 16. In addition, lips 22 and 23 are deformed so that surfaces 27, 28 of rings 11 and 12 have moved toward each other so that the maximum transverse dimension C therebetween now coincides with dimension D so that the outer ends of lips 22, 23 are likewise in initial sealing contact with surfaces 15 and 17.

The overall length G of the composite packing when installed is preferably somewhat shorter than the length H of groove 18. When there is high fluid pressure on one side 47 of piston 19, such high pressure fluid will pass through the clearance 43 between the piston and cylinder and enter chamber 18 to exert pressure across the adjacent end of ring 12 to force the upper end of ring 11 against end surface 49 of groove 18 and cause axial compressive force to be applied to first ring 10. Because of the elastomeric or deformable nature of ring 10 the axial compressive force will be translated into transversely acting force that causes central portion 30 to exert increased sealing force against piston and cylinder surfaces 17 and 15. Likewise, the axial compressive force exerted on axial extensions 40 will be translated into transverse forces acting upon lips 22, 23 to deform the same into tighter sealing engagement with surfaces 15, 17 and therefore preventing extrusion of the softer material of ring 10 between such lips 20, 23 and surfaces 15, 17.

A similar sealing effect is obtained when high pressure is acting at the opposite end 48 of the piston and has access to groove 18 via clearance 44. In this case, the high fluid pressure entering at 44 moves the packing assembly so that the bottom end of ring 12 engages end wall 50 of groove 18 and the high pressure fluid acts between the upper end of ring 11 and end wall 49 of groove 18 to apply axial compressive force to the packing.

Figure 2:
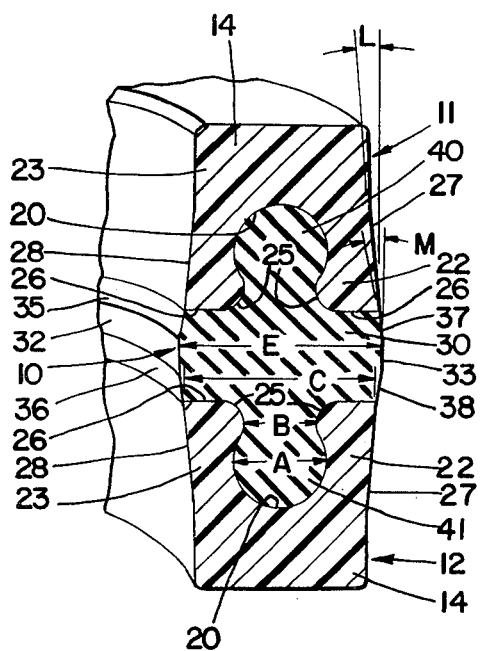
FIG. 2 is a cross section view of the composite ring in its initial or uninstalled condition.

Inclined surfaces 35, 36, 37 and 38 of ring 10 by meeting the outer corners of lips 22, 23 permit the surfaces 32, 33 to project radially beyond lip surfaces 27, 28 and yet permit deformation of central portion 30 from the initial condition of FIG. 2 to the installed condition of FIG. 3 without permitting any of the material of the ring 10 to lodge between lips 22, 23 and the respective piston and cylinder surfaces 17, 15, thus preventing extrusion of the material of ring 10 between lips 22, 23 and the adjacent surfaces 15, 17 when fluid pressure is applied in either direction.

Rings 11 and 12 are of harder or less readily deformable material than ring 10 so that they will not extrude into clearances 43, 44 under high fluid pressure. Ring 10 is of softer material so that it will readily deform into sealing engagement with surfaces 15, 17 but when soft enough for this purpose might extrude into clearances 43, 44 if the U cups 11, 12 were not provided to act as backup rings to prevent such extrusion.

Width W of the rings 11, 12 is appreciably less than width D so that the base portions 14 will not engage surfaces 15, 17 and become jammed therebetween. Because of the greater hardness of rings 11, 12, the base portions 14 will not increase significantly in their widths W even under high fluid pressure whereby clearance with surfaces 15, 17 will be maintained. On the other hand lips 22, 23 will bend quite readily, as opposed to plastic deformation, and will deflect from an initial dimension equal to C across their outer edges to dimension D so as to establish an area of contact J with surfaces 15, 17 before application of fluid pressure, which is less than 25% of the axial length of the lips extending from outer surfaces 26 to the bottom of recesses 20. The surfaces 26 are substantially normal to the longitudinal axis of rings 11, 12 so that there will be no outward wedging action by ring 10 at this location so that excessive contact pressure will not be developed at area J which would otherwise result in excessive friction against surface 15 when the piston moves within the cylinder. The straight across surfaces 26 also minimize forcing of material from the central portion 30 of ring 10 into recesses 20 to therefore also assist in avoiding excessive sideward force of extentions 40, 41 against lips 22, 23 which would otherwise cause excessive widening of area J and excessive friction between the lips and surfaces 15, 17.

I claim:

1. A composite packing comprising a first ring of deformable elastomeric material positioned between second and third rings of deformable material but which is less readily deformable than the first ring, said second and third rings each having a recess open to an axial end thereof that faces and is adjacent the first ring, said recesses each forming radially inner and outer lips on the respective second and third rings, each recess having an undercut, said first ring having a central portion and an axial extension at each end of the central portion, each lip having a free end adjacent said central portion, each axial extension fitting within a respective one of said recesses and extending laterally into the undercut thereof to form a mechanical interlock therewith whereby said interlocks cause said rings to be retained as a unitary assembly.

2. The packing of claim 1 in which said first ring is free of adherence to said second and third rings other than via said interlocks.

3. The packing of claim 1 in which said first ring extends transversely beyond said lips but only at said central portion.

4. The packing of claim 3 in which said central portion abuts said free ends, and the radially inner and outer diameters of said central portion where it abuts the ends of said lips being respectively the same as the radially inner diameters of the radially inner lips and the radially outer diameter of the radially outer lips.

5. The packing of claim 4 in which said extensions completely fill said recesses, the free ends of said lips having surfaces extending in a direction substantially normal to the central axes of said rings, and said central portion conforms to and engages said surfaces.

6. The packing of claim 5 in which said central portion extends transversely beyond said lips on one radial side of said central portion.

7. The packing of claim 5 in which said central portion extends transversely beyond said lips on both radial sides of said central portion.

8. The packing of claim 7 in which the radially inner and outer diameters of said central portion where it abuts said surfaces being respectively the same as the radially inner diameters of said surfaces of the inner lips and the radially outer diameters of said surfaces of the outer lips.

9. The packing of claim 1 in which each of said free ends has an outer surface that extends substantially normal to the longitudinal axis of the packing.

10. A packing comprising a first ring positioned between second and third rings, the material of the rings being deformable with material of the first ring being more readily deformable than the material of the second and third rings, said second and third rings each having a recess open to an axial end thereof that faces said first ring, said recesses forming radially inner and outer axially extending lips on the second and third rings, each recess having an undercut, said first ring having a central portion and an axial extension at each end of the central portion, one axial extension fitting into the recess of the second ring and the other extension fitting into the recess of the third ring, each extension projecting into the respective undercut and completely filling the respective recess, each lip at its free end having a transverse surface that is substantially normal to the longitudinal axes of said rings, said central portion having four transverse faces each of which is coextensive with and engages a respective one of said surfaces, and said central portion extending radially inwardly of the inner lips only at a location axially between said surfaces, the radially inner face of the inner lips initially extending at an angle to said longitudinal axes from a smaller diameter at the free ends of said inner lips to a larger diameter at a location axially spaced from the respective free end, and the radially outer faces of said outer lips initially extending at an angle to said longitudinal axes from a larger diameter at the free ends of said outer lips to a smaller diameter at a location axially spaced from the respective free end, and the radially inner and outer faces of said central portion having tapered portions thereof extending generally axially from a location adjacent the free end of a respective lip at an angle with said axes that is greater than said angle of the respective lip.

11. The packing of claim 10 in which said central portion has cylindrical portions between said tapered portions.

12. In combination, a pair of opposed annular relatively movable surfaces to be sealed, said surfaces being radially spaced a predetermined distance and forming a chamber therebetween, a composite packing within said chamber, said packing comprising a first ring of deformable elastomeric material positioned between second and third rings of deformable material but which is less readily deformable than the first ring, said second and third rings each having a base and a recess open to an axial end thereof that faces and is adjacent the first ring, said recesses each forming radially inner and outer lips on the respective second and third rings that project axially away from said base, each recess having an undercut, said first ring having a central portion and an axial extension at each end of the central portion, each lip having a free end adjacent said central portion, each axial extension fitting within a respective one of said recesses and extending laterally into the undercut thereof to form a mechanical interlock therewith whereby said interlocks cause said rings to be retained as a unitary assembly, the transverse distance between radially outer edges of each pair of inner and outer lips being initially greater than said predetermined distance, the outer side surfaces of said lips being tapered from said edges toward the respective base, and each base having an initial cross section width that is less than said predetermined distance, and said lips being bendable so as to fit within said recess with said edges engaging said surfaces.

13. The combination of claim 12 in which said lips and bases are initially formed and dimensioned so that upon said bending of the lips said lips will engage in area contact with said surfaces with the axial length of said area contact being less than 25% of the axial length of the lips.

* * * * *